(12) United States Patent
Zhang et al.

(10) Patent No.: US 11,481,110 B2
(45) Date of Patent: Oct. 25, 2022

(54) GESTURE BUTTONS

(71) Applicant: MICRO FOCUS LLC, Santa Clara, CA (US)

(72) Inventors: Bing Zhang, Shanghai (CN); Da-Long Sun, Shanghai (CN); Li Zhang, Shanghai (CN); Rong-Feng Chen, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/762,841

(22) PCT Filed: Nov. 29, 2017

(86) PCT No.: PCT/CN2017/113506
§ 371 (c)(1),
(2) Date: May 8, 2020

(87) PCT Pub. No.: WO2019/104519
PCT Pub. Date: Jun. 6, 2019

(65) Prior Publication Data
US 2020/0285380 A1    Sep. 10, 2020

(51) Int. Cl.
*G06F 3/04883* (2022.01)
*G06F 3/0482* (2013.01)
*H04M 1/724* (2021.01)

(52) U.S. Cl.
CPC ........ *G06F 3/04883* (2013.01); *G06F 3/0482* (2013.01); *H04M 1/724* (2021.01)

(58) Field of Classification Search
CPC .............. G06F 3/04883; G06F 3/0482; G06F 3/04815; H04M 1/724; G06T 19/003
USPC ........................................................ 715/863
See application file for complete search history.

(56) References Cited

U.S. PATENT DOCUMENTS

| 8,468,466 | B2 | 6/2013 | Cragun et al. |
| 9,524,097 | B2 | 12/2016 | Herring |
| 10,627,987 | B2 * | 4/2020 | Aggarwal ........... G06F 3/04883 |
| 2010/0275166 | A1 | 10/2010 | Jeon |

(Continued)

FOREIGN PATENT DOCUMENTS

| CN | 102096549 A | 6/2011 |
| CN | 102945138 A | 2/2013 |

(Continued)

OTHER PUBLICATIONS

Author Unknown; Smart Touch (Easy Touch-Assistive Touch)—Android Apps on Google Play; Reddit, Inc.; Aug. 2017; 5 Pages.

(Continued)

*Primary Examiner* — Dino Kujundzic
*Assistant Examiner* — Jianmei F Duckworth
(74) *Attorney, Agent, or Firm* — Sheridan Ross P.C.

(57) ABSTRACT

In one example, a system for gesture buttons can include a processing resource and a non-transitory computer readable medium having stored thereon instructions to cause the processing resource to perform a first function in response to a gesture provided to the user interface, display a gesture button on the user interface, and perform a second function that is different than the first function in response to the gesture provided on the gesture button displayed on the user interface.

12 Claims, 5 Drawing Sheets

(56) References Cited

U.S. PATENT DOCUMENTS

| | | | |
|---|---|---|---|
| 2011/0285636 A1* | 11/2011 | Howard | A63F 13/2145 |
| | | | 345/173 |
| 2012/0284673 A1* | 11/2012 | Lamb | G06F 3/04883 |
| | | | 715/863 |
| 2013/0326420 A1 | 12/2013 | Liu | |
| 2015/0220218 A1 | 8/2015 | Jeon et al. | |
| 2015/0378459 A1* | 12/2015 | Sawada | G06F 3/041 |
| | | | 345/173 |
| 2016/0179337 A1* | 6/2016 | Ballesteros | G06F 3/0481 |
| | | | 715/773 |
| 2016/0188181 A1* | 6/2016 | Smith | G06F 3/013 |
| | | | 715/765 |
| 2016/0202852 A1 | 7/2016 | Park | |
| 2018/0157395 A1* | 6/2018 | Mhun | G06F 3/04812 |

FOREIGN PATENT DOCUMENTS

| | | |
|---|---|---|
| CN | 104281408 A | 1/2015 |
| CN | 106598425 A | 4/2017 |
| CN | 304232436 S | 8/2017 |
| WO | WO-WO2016094253 A1 | 6/2016 |

OTHER PUBLICATIONS

International Written Opinion/Search Report; PCT/CN2017/113506; dated Aug. 1, 2018; 9 pages.
Nick Bibich; In-App Gestures and Mobile App User Experience; Smashing Magazine; Oct. 2016; 8 pages.

* cited by examiner

GESTURE BUTTONS

BACKGROUND

Computing devices can utilize a user interface to display text documents and image documents. The computing devices can include touch screen user interfaces for navigating images displayed on the user interface. Navigating a user interface can be utilized to highlight particular areas of the text or image documents.

DETAILED DESCRIPTION

A number of systems, devices, and methods for utilizing gesture buttons are described herein. In some examples, a system for gesture buttons can include a processing resource and a non-transitory computer readable medium having stored thereon instructions to cause the processing resource to perform a first function in response to a gesture provided to the user interface, display a gesture button on the user interface, and perform a second function that is different than the first function in response to the gesture provided on the gesture button displayed on the user interface. In some examples, the gesture buttons described herein can be displayed on a user interface of a computing device. For example, the gesture buttons can be displayed on a touch screen display of a mobile computing device.

As used herein, a gesture can include an input that comprises a motion from a first position to a second position. For example, the input can be a motion from a top portion of a user interface to a bottom portion of the user interface. In this example, the input of the gesture can be the complete motion from the top portion to the bottom portion of the user interface. Computing devices can utilize gestures to perform corresponding functions. In some examples, a gesture can be a short-cut to perform the corresponding function. For example, a gesture can be utilized to zoom in and zoom out from a displayed image or text on the user interface. In this example, the same function for zooming in and zooming out may be performed without the gesture by selecting a menu that includes the function to zoom in and zoom out. In this example, it can be relatively easier and quicker to zoom in and zoom out by utilizing the corresponding gesture.

The present disclosure includes examples of gesture buttons that can be utilized to alter a corresponding function of a particular gesture. For example, a gesture can be utilized to scroll or change a view of the user interface. In this example, a gesture button can be utilized to change the function of the gesture from the scroll or change a view function to a split the view of the user interface function. That is, a different function can be performed when the gesture is performed on the gesture button than a function performed when the gesture is performed without the gesture button. In this way, the gesture buttons described herein can be utilized to allow a single gesture to perform a plurality of different functions.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
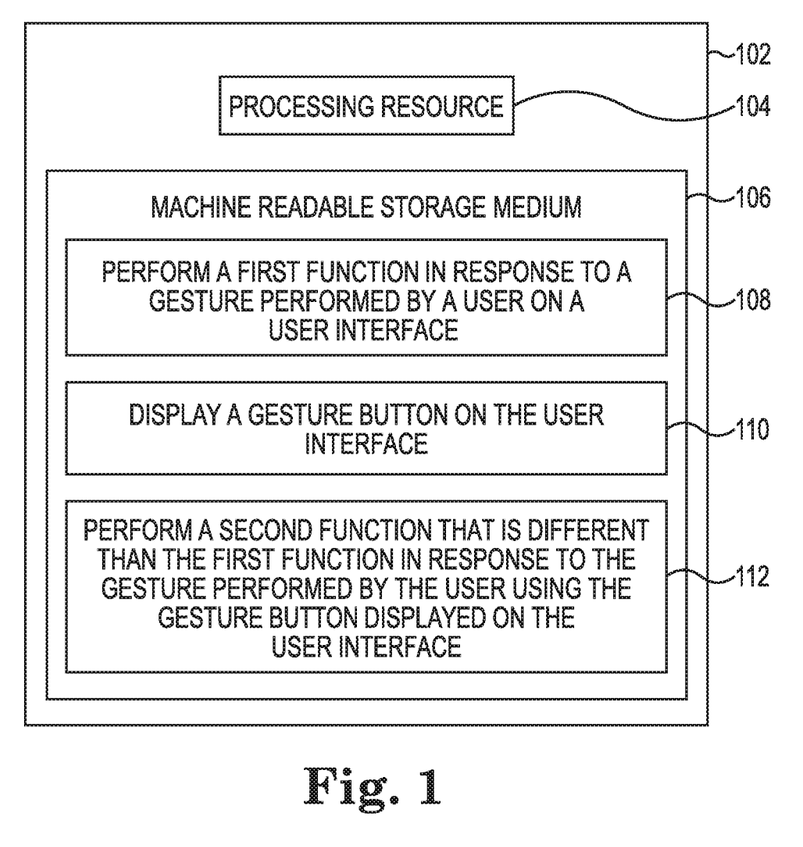
FIG. 1 illustrates an example of a computing device for utilizing gesture buttons consistent with the present disclosure.

FIG. 1 illustrates an example of a computing device 102 for utilizing gesture buttons consistent with the present disclosure. In some examples, the computing device 102 can include a user interface that can display images or text. In some examples, the display can be a touch screen that can receive inputs such as gestures. In some examples, the computing device 102 can include a touchless user interface that can be utilized to receive inputs such as gestures. The computing device 02 can include a memory resource 106 that can be utilized to store instructions 108, 110, 112 that can be executed by a processing resource 104 to perform functions described herein.

A processing resource 104 may be a central processing unit (CPU), microprocessor, and/or other hardware device suitable for retrieval and execution of instructions stored in memory resource 106. In some examples, the processing resource 104 can be coupled to the memory resource 106 via a connection. The connection can be a physical or wireless communication connection. In the particular example shown in FIG. 1, processing resource 104 may receive, determine, and send instructions 108, 110, 112. As an alternative or in addition to retrieving and executing instructions 108, 110, 112, processing resource 104 may include an electronic circuit comprising a number of electronic components for performing the operations of the instructions 108, 110, 112 in the memory resource 106. With respect to the executable instruction representations or boxes described and shown herein, part or all of the executable instructions 108, 110, 112 and/or electronic circuits included within one box may be included in a different box shown in the figures or in a different box not shown.

Memory resource 106 may be any electronic, magnetic, optical, or other physical storage device that stores executable instructions 108, 110, 112. Thus, memory resource 106 may be, for example, Random Access Memory (RAM), an Electrically-Erasable Programmable Read-Only Memory (EEPROM), a storage drive, an optical disc, and the like. The executable instructions 108, 110, 112 may be stored on the memory resource 106. Memory resource 106 may be a portable, external or remote storage medium, for example, that allows the system to download the instructions 108, 110, 112 from the portable/external/remote storage medium. In this situation, the executable instructions 108, 110, 112 may be part of an "installation package". As described herein, memory resource 106 may be encoded with executable instructions 108, 110, 112 for remote device configurations as described herein.

In some examples, the memory resource 106 can include instructions 108 to perform a first function in response to a gesture performed by a user on a user interface. As described herein, the gesture can include a motion that starts at a first position and ends at a second position. For example, a gesture can be a swipe gesture that starts an input at the first position and ends the input at the second position. In some examples, the gesture can be a single point gesture (e.g., swipe gesture, scroll gesture, etc.) or a dual point gesture (e.g., pinch gesture, stretch gesture, etc.). For example, a single point gesture can be a single input that starts at the first position and ends at the second position. In another example, a dual point gesture can include two inputs that start at the first position where a first input of the two inputs ends a second position and the second input of the two inputs ends at a third position.

In some examples, the gesture can be an input for the computing device 102. In some examples, the gesture can be provided to the computing device 102 utilizing a peripheral device (e.g., touch screen, mouse, touchless interface, etc.). For example, the computing device 102 can be a mobile computing device (e.g., tablet, smartphone, laptop, etc.) that utilizes a user interface that is a touchscreen to receive inputs. In this example, a gesture can be a contact input that starts at a first position and moves to a second position without removing the contact on the touchscreen. In this example, the gesture can initiate a corresponding function of the computing device 102.

In some examples, the computing device 102 can recognize a plurality of different gestures and execute instructions to perform functions that correspond to each of the plurality of different gestures. For example, the computing device 102 can recognize swipe gestures, pinch gestures, tap gestures, stretch gesture, among other types of gestures that include a movement to generate an input. In this example, each of the different gestures can be received by the computing device 102 and the computing device 102 can execute instructions to perform a corresponding function.

In some examples, the memory resource 106 can include instructions 110 to display a gesture button on the user interface. In some examples, a gesture button can include an image that is displayed on the user interface of the computing device 102. For example, a semi-transparent circle can be displayed on a user interface of the computing device. As described herein, the computing device 102 can be a mobile device with a user interface that can is a touchscreen display. In some examples, the gesture button can be displayed on the user interface at a particular location over other images or text displayed on the user interface. In some examples, the gesture button can be semi-transparent to display images or text displayed behind the gesture button.

In some examples, the gesture button can be displayed in response to an instruction or input. For example, the gesture button can be displayed on the user interface in response to a menu selection or gesture. In some examples, the gesture button can be removed from the user interface in response to a menu selection or gesture. In some examples, the gesture button can be removed from the user interface to avoid distracting a user utilizing the user interface. In some examples, the computing device can include instructions to alter a location of the gesture button from a first location on the user interface to a second location on the user interface. For example, the gesture button can be moved from a first corner of the user interface to a second corner of the user interface that is different than the first corner.

In some examples, the gesture button can be positioned at a particular location such that a gesture that intercepts the gesture button can provide a different function compared to when the gesture does not intercept the gesture button. For example, a gesture button can be positioned at a first location. In this example a gesture can have a start location at the first location and an end location at a second location.

In this example, the computing device 102 can provide an altered function in response to the gesture with the start location at the first location compared to the same gesture with a start location at a different location.

In some examples, the memory resource 106 can include instructions 112 to perform a second function that is different than the first function in response to the gesture performed by the user using the gesture button displayed on the user interface. As described herein, the gesture button can be displayed on the user interface such that a gesture can be provided on the gesture button. For example, the gesture button can be positioned within the boundaries of a user interface of the computing device 102 such that the gesture button can be a start location of a gesture. As used herein, a start location of the gesture can include a position where the gesture begins.

In some examples, the gesture can include a path between a start location and an end location. For example, the gesture can have a start location where the gesture begins and an end location where the gesture ends. In some examples, the gesture can be provided on the gesture button when the gesture button is positioned within the path of the gesture. For example, the gesture can be a pinch gesture that starts at a first location and crosses the gesture button before the end location. In some examples, the gesture can be provided on the gesture button when the gesture button is at the end location of the gesture. For example, the gesture can be a swipe gesture that starts at a first location and ends at a location of the gesture button.

As described herein, when the gesture is provided on the gesture button displayed on the user interface a second function that is different than the first function can be performed by the computing device 102. For example, a swipe gesture that is not provided on the gesture button can cause the computing device 102 to perform a first function that alters a view of an image. In this example, the swipe gesture that is provided on the gesture button can cause the computing device 102 to perform a second function that saves the image to the memory resource 106 of the computing device 102. In this way, the same gesture can provide different inputs to the computing device 102 and can instruct the computing device 102 to perform different functions.

In some examples, the second function can be a custom function or altered function. In some examples, a custom function can be selected from a plurality of functions. For example, a plurality of functions can be displayed on the user interface and a particular function can be selected as a custom function or a function to be performed by the computing device 102 when the gesture is provided on the gesture button. In this way, a familiar gesture that is utilized for other functions (e.g., the first function, etc.) can be utilized for the custom function (e.g., second function, etc.) when the gesture is provided on the gesture button. In some examples, the second function can be altered based on an application displayed on the user interface. For example, the second function can be a particular function when a first application is displayed on the user interface and a different function when a second application is displayed on the user interface. In some examples, a custom function for a particular gesture can be selected from a plurality of functions for each of a plurality of different applications.

The computing device 102 described herein can display a gesture button on a user interface to allow the same gesture or type of gesture to correspond to multiple different functions performed by the computing device 102. In some examples, having a corresponding gesture for each of a plurality of functions performed by the computing device 102 can make it difficult for a user to remember which gesture corresponds to which function. In addition, the gesture button can be utilized to generate custom functions for a particular gesture when the gesture is provided on the gesture button.

Figure 2:
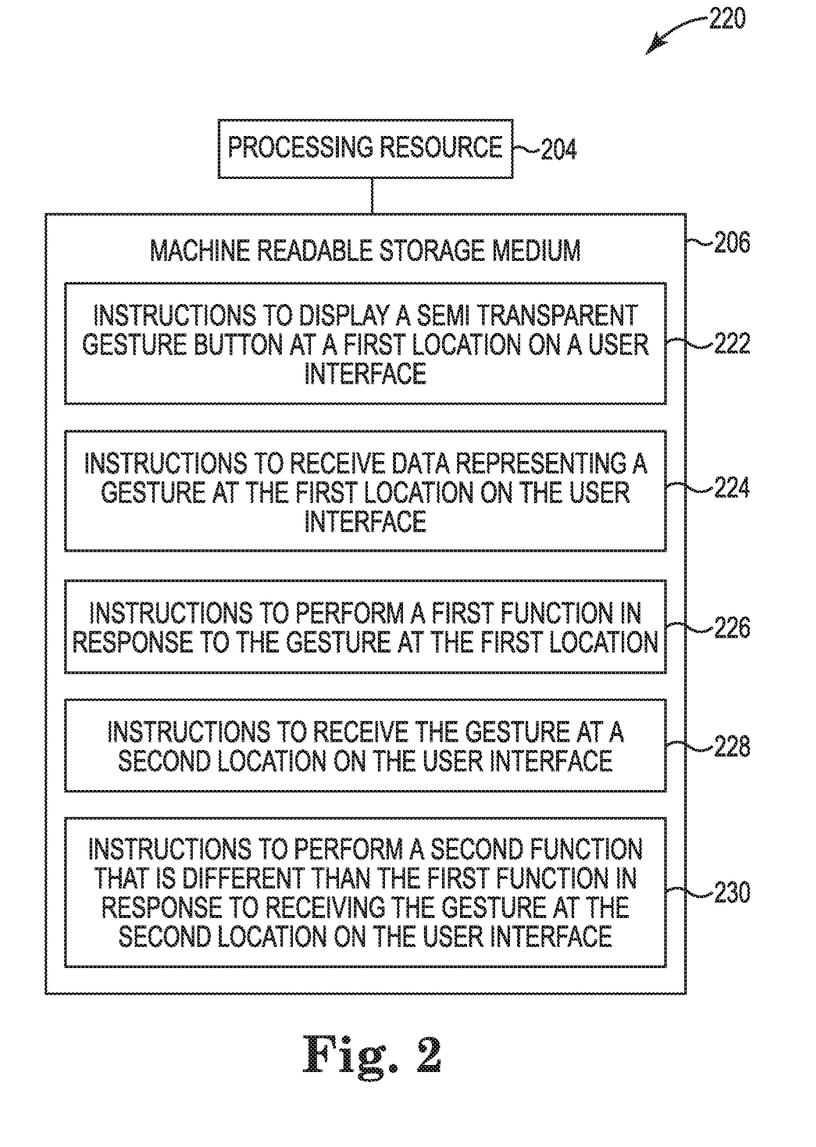
FIG. 2 illustrates an example of a system for utilizing gesture buttons consistent with the present disclosure.

FIG. 2 illustrates an example of a system 220 for utilizing gesture buttons consistent with the present disclosure. In some examples, the system 220 can include a machine readable storage medium 206 that can be utilized to store instructions 222, 224, 226, 228, 230 that can be executed by a processing resource 204 to perform functions described herein.

A processing resource 204 may be a central processing unit (CPU), microprocessor, and/or other hardware device suitable for retrieval and execution of instructions stored in machine readable storage medium 206. In some examples, the processing resource 204 can be coupled to the machine readable storage medium 206 via a connection. The connection can be a physical or wireless communication connection. In the particular example shown in FIG. 2, processing resource 204 may receive, determine, and send instructions 222, 224, 226, 228, 230. As an alternative or in addition to retrieving and executing instructions 222, 224, 226, 228, 230, processing resource 204 may include an electronic circuit comprising a number of electronic components for performing the operations of the instructions 222, 224, 226, 228, 230 in the machine readable storage medium 206. With respect to the executable instruction representations or boxes described and shown herein, it should be understood that part or all of the executable instructions 222, 224, 226, 228, 230 and/or electronic circuits included within one box may be included in a different box shown in the figures or in a different box not shown.

Machine readable storage medium 206 may be any electronic, magnetic, optical, or other physical storage device that stores executable instructions 222, 224, 226, 228, 230. Thus, machine readable storage medium 206 may be, for example, Random Access Memory (RAM), an Electrically-Erasable programmable Read-Only Memory (EEPROM), a storage drive, an optical disc, and the like. The executable instructions 222, 224, 226, 228, 230 may be stored on the machine readable storage medium 206. Machine readable storage medium 206 may be a portable, external or remote storage medium, for example, that allows the system to download the instructions 222, 224, 226, 228, 230 from the portable/external/remote storage medium. In this situation, the executable instructions 222, 224, 226, 228, 230 may be part of an "installation package". As described herein, machine readable storage medium 206 may be encoded with executable instructions 222, 224, 226, 228, 230 for remote device configurations as described herein.

In some examples, the machine readable storage medium 206 can include instructions 222 to display a semi-transparent gesture button at a first location on a user interface. As described herein, a gesture button can be an image or shape that is displayed at a particular location on the user interface of the system 220. In some examples, the gesture button can be semi-transparent to allow images and/or text to be displayed behind the gesture button while allowing the location of the gesture button to be identified on the user interface. For example, the gesture button can be a semi-transparent circle that includes a transparent center and a semi-transparent outline to identify the location of the gesture button.

In some examples, the user interface can be coupled to the system 220. For example, the user interface can be part of a mobile device or laptop computing device. In this example, a gesture can be provided on a touch screen of the user interface of the mobile device or laptop computing device.

In some examples, the user interface can be communicatively coupled to the system 220. For example, the user interface can be a display or monitor that is communicatively coupled to the system 220. In this example, the gesture can be provided via a peripheral device such as a mouse or touchless interface. In some examples, the gesture button can be displayed on the display or monitor that is communicatively coupled to the system 220 and the gesture can be provided via the mouse or touchless interface.

In some examples, the machine readable storage medium 206 can include instructions 224 to receive data representing a gesture at the first location on the user interface. In some examples, the gesture can be provided at the first location when a starting point of the gesture is at the first location. In other examples, the gesture can be provided at the first location when a path of the gesture passes over the first location. In other examples, the gesture can be provided at the first location when the overall path of the gesture is within the first location. For example, the gesture button can be positioned on a particular side of the user interface that is not at the first location and the gesture can be provided at the first location when the gesture is not provided on the particular side of the user interface.

In some examples, the machine readable storage medium 206 can include instructions to move the gesture button from the first location to the second location of the user interface. In these examples, the machine readable storage medium 206 can include instructions to receive the gesture at the second location when the gesture button is at the second location and to perform the first function in response to receiving the gesture at the second location. That is, the location of the gesture button can be moved to a plurality of different locations and perform a custom function associated with the gesture button. In some examples, the gesture can be received at the second location when the gesture button is at the second location and perform a third function that is different than the first function and the second function.

In some examples, the gesture button can be removed from the user interface. In these examples, the gesture received at the first location and the gesture at the second location can result in the same function when the gesture button is not displayed at the first location. That is, the gesture can continue to perform a particular function despite a location when the gesture button is not displayed on the user interface.

In some examples, the machine readable storage medium 206 can include instructions 226 to perform a first function in response to the gesture at the first location. As described herein, the first location can be a location where the gesture button is positioned on the user interface. That is, the gesture at the first location can be a gesture that is provided on the gesture button positioned at the first location. As described herein, the gesture provided on the gesture button can include when the gesture starts at the first location, the gesture path passes over the first location, and/or when the gesture ends at the first location. As described further herein, the first function can be a different function than a predefined function for the same gesture since the gesture was received at the first location and not a different location.

In some examples, the machine readable storage medium 206 can include instructions 228 to receive the gesture at a second location on the user interface. In some examples, the second location can be a location of the user interface that does not include the gesture button. For example, the gesture button can be positioned on a right side of the user interface.

In this example, the second location can be a left side of the user interface. In some examples, the first location can be an area within an image or shape of the gesture button. For example, the gesture button can be in the shape of a square and the first location can be an area within the square. In this example, the second location can be an area of the user interface outside of the square.

In some examples, the gesture at the second location can be a gesture that does not start at the first location. For example, the gesture can include a start position that is not within an area of the gesture button at the first location. In some examples, the gesture at the second location can be a gesture with a path that does not cross the first location. For example, the gesture can include a path that does cross an area within the image or shape of the gesture button.

In some examples, the machine readable storage medium 206 can include instructions 230 to perform a second function that is different than the first function in response to receiving the gesture at the second location on the user interface. As described herein, the second location can be a location that is different than the location of the gesture button. In some examples, the second function in response to the gesture can be a predefined function that corresponds to the gesture. For example, the system 220 can include predefined instructions that correspond to the gesture. In this example, the predefined instructions can be instructions that are defined by a manufacturer of the system 220. In some examples, the second function can correspond to function defined by an application. For example, an application can be displayed on the user interface. In this example, the application can include instructions to execute when the gesture is received by the system 220.

In some examples, the second function can be a function that would be performed when the gesture is received at the user interface without utilizing the gesture button. For example, the second function can be predefined functions that correspond to the gesture prior to utilizing the gesture button. In some examples, the system 220 can utilize a peripheral device that can receive gestures. For example, the system 220 can utilize a touchscreen that can receive gestures when an input begins at a first position and moves to a second position without stopping the input. In some examples, other peripheral devices can be utilized to receive gestures in a similar manner.

In some examples, the system 220 can be utilized to add additional functionality to a single type of gesture. In some examples, types of gestures can be limited for a particular peripheral device or user interface. For example, identifying a particular gesture can be difficult when more gestures are added to the system since additional gestures can interfere with existing gestures. In some examples, it can also be difficult for a user to remember additional gestures for a plurality of additional functions. Thus, it can be beneficial to have a limited quantity of gestures that have a plurality of functions as described herein.

Figure 3:
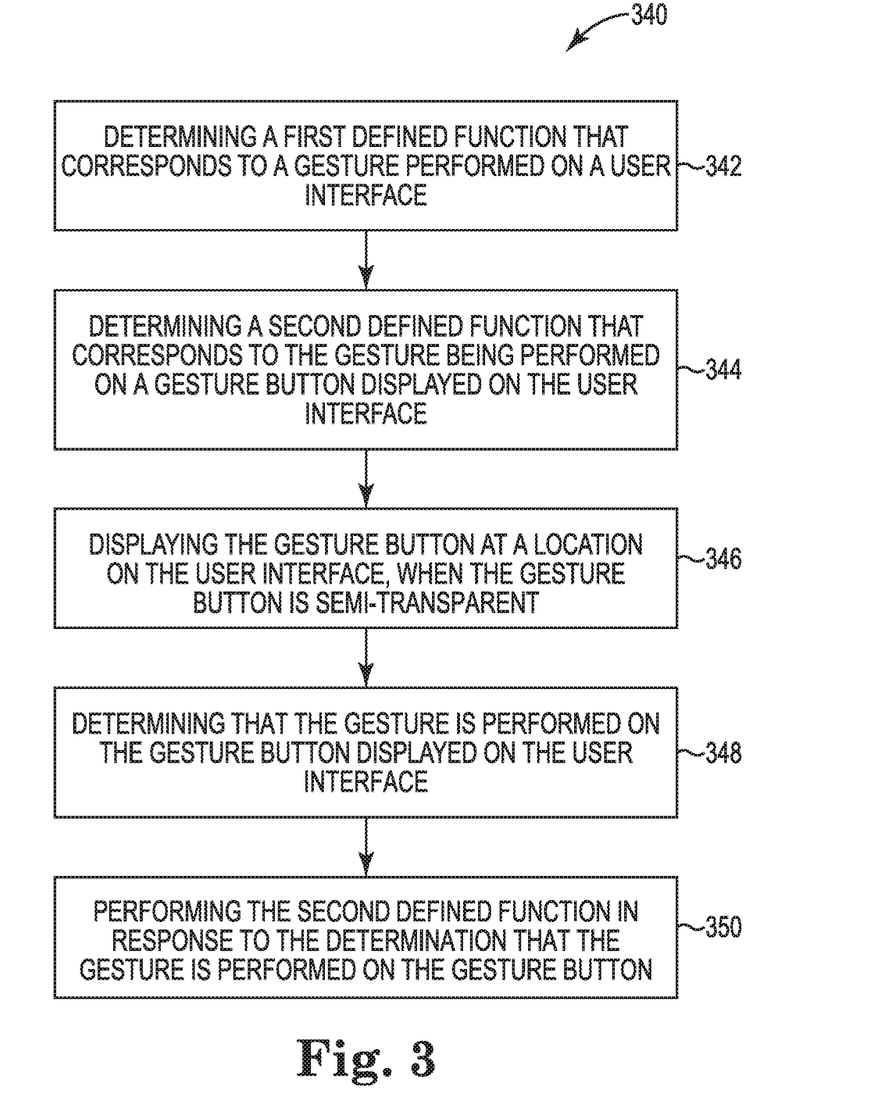
FIG. 3 illustrates an example of a method for utilizing gesture buttons consistent with the present disclosure.

FIG. 3 illustrates an example of a method 340 for utilizing gesture buttons consistent with the present disclosure. In some examples, the method 340 can be performed by one or more computing devices. For example, the method 340 can be performed by a computing device 100 as referenced in FIG. 1 and/or or a system 220 as referenced in FIG. 2, as described herein. In some examples, the computing device 100 as referenced in FIG. 1 can be coupled to a user interface to display a gesture button as described herein.

At block 342, the method 340 can include determining a first defined function that corresponds to a gesture performed on a user interface. In some examples, the first defined function can correspond to a gesture that is provided at a location that is not on a gesture button. In some examples, the first defined function can correspond to a gesture that is provided to the user interface when a gesture button is not displayed on the user interface.

In some examples, determining a first defined function can include determining a function for the gesture when a gesture button is not displayed on the user interface. In some examples, the determining the first defined function can include determining a predefined function for the gesture. For example, the determining the first defined function for the gesture can include determining a current application displayed on the user interface and determine a corresponding function for the gesture when the current application is displayed.

In some examples, the method 340 can include determining predefined gestures and corresponding functions for an application displayed on the user interface. In some examples, the first defined function can be based on the application that is displayed on the user interface. For example, a particular application can include instructions for performing a function in response to the gesture that is different than a different application. Thus, determining the first defined function can be determined based on the application that is currently displayed on the user interface.

At block 344, the method 340 can include determining a second defined function that corresponds to the gesture being performed on a gesture button displayed on the user interface. In some examples, the second defined function can be a function that is defined when the gesture is provided to the gesture button. For example, the second defined function can be selected from a plurality of functions to be executed when the gesture is provided to the gesture button as described herein.

In some examples, the second defined function can be a custom function that is performed when the gesture is provided to the gesture button. For example, the second defined function can be selected from a plurality of defined functions. In some examples, the second defined function can be a custom function for a particular application. For example, the second defined function can be selected for a particular application such that the second defined function can be performed when the gesture is provided to the gesture button when the particular application is displayed on the user interface. In some examples, the second defined function can be a plurality of different functions that each correspond to a different application.

At block 346, the method 340 can include displaying the gesture button at a location on the user interface, wherein the gesture button is semi-transparent. As described herein, the semi-transparent gesture button can include an image or shape that allows text or images displayed behind the gesture button to be displayed. In some examples, the semi-transparent gesture button can be a square or circle that includes a semi-transparent portion and a transparent portion to identify an area within the square or circle. For example, the semi-transparent gesture button can be a circle that includes an outline of a circle that is semi-transparent and an interior portion of the circle that is transparent. By utilizing a semi-transparent gesture button, the gesture button can be displayed on the user interface while a user is reading text or viewing an image without the gesture button interfering.

In some examples, the method 340 can include determining a location of the gesture button displayed on the user interface. For example, the method 340 can determine an area within the gesture button to determine whether the gesture was provided on the gesture button or provided off of the gesture button. In other examples, the location of the gesture button displayed on the user interface can be utilized to determine a corresponding function for a gesture that intersects the area of the gesture button. In some examples, the method 340 can include altering the second defined function based on the location of the gesture button displayed on the user interface. For example, when the gesture button is at a first location the second defined function can be a first function type and when the gesture button is at a second location the second defined function can be altered to a second function type.

At block 348, the method 340 can include determining that the gesture is performed on the gesture button displayed on the user interface. As described herein, determining when the gesture is provided to the gesture button can include determining when a start location of the gesture is at a location that is within an area of the gesture button. For example, the gesture can be provided to a gesture button shaped as a circle when the gesture starts within the area of the circle. In other examples, determining when the gesture is provided to the gesture button can include determining when a path of a gesture is within the area of the gesture button. For example, a gesture can include a path between a start location and an end location. In this example, the path of the gesture can cross within the area of the gesture button and it can be determined that the gesture is provided to the gesture button.

At block 350, the method 340 can include performing the second defined function in response to the determination that the gesture is performed on the gesture button. As described herein, the second defined function can be a custom function or function that is different than the first defined function. In some examples, performing the second defined function can include a processing resource executing instructions stored in a memory resource in response to the gesture being provided to the gesture button. In some examples, the gesture can be the same gesture the was used to perform the first defined function as described herein. In some examples, the second defined function can correspond to an application that is displayed when it is determined that the gesture is provided to the gesture button.

Figure 4:
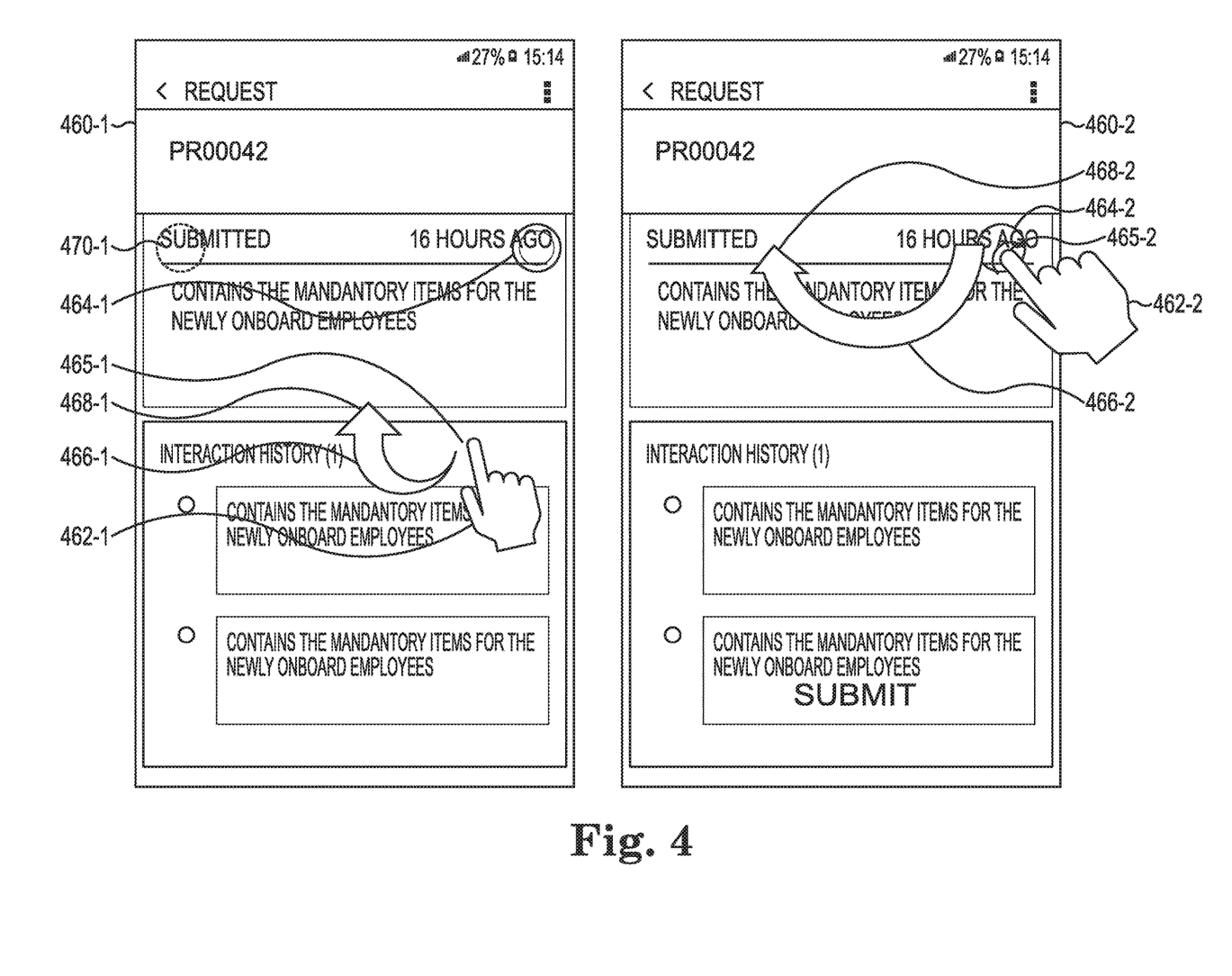
FIG. 4 illustrates an example of a user interface for utilizing gesture buttons consistent with the present disclosure.

FIG. 4 illustrates an example of a user interface 460-1, 460-2 for utilizing gesture buttons 464-1, 464-2 consistent with the present disclosure. In some examples, the user interface 460-1, 460-2 can be a display of a non-mobile computing device (e.g., desktop computer, television monitor with a computing device, etc.) that utilizes a peripheral device (e.g., mouse, touchless interface, etc.). In some examples, the user interface 460-1, 460-2 can be a display of a mobile computing device as described herein. For example, the user interface 460-1, 460-2 can utilize a touchscreen user interface.

In this example, a peripheral device 462-1, 462-2 can be a finger or hand of a user. In some examples, the peripheral device 462-1, 462-2 can be utilized to provide an input to the computing device of the user interface 460-1, 460-2. For example, the peripheral device 462-1, 462-2 can be a finger that touches a touch screen display of the user interface 460-1, 460-2. In another example, the peripheral device 462-1, 462-2 can be a mouse cursor that can be moved by a computing mouse device. In another example, the peripheral device 462-1, 462-2 cursor generated by a touchless interface (e.g., camera, etc.) that is displayed at a corresponding location at a distance from the user interface 460-1, 460-2.

In some examples, the peripheral device 462-1, 462-2 can be utilized to provide a gesture 466-1, 466-2 on the user interface 460-1, 460-2. In some examples, the gesture 466-1, 466-2 can include a start location 465-1, 465-2 and a stop location 468-1, 468-2. In some examples, the area between the start location 465-1, 465-2 and the stop location 468-1, 468-2 can be the pathway of the gesture 466-1, 466-2. In some examples, the gesture 466-1, 466-2 can be performed on the user interface 460-1, 460-2 when a selection is made at the start location 465-1, 465-2 and continues until the stop location 468-1, 468-2.

In some examples, the user interface 460-1 can illustrate a gesture 466-1 that is not provided on a gesture button 464-1. For example, the gesture 466-1 can include a start location 465-1 that is not at the location of the gesture button 464-1. As described herein, the gesture 466-1 may not be provided on the gesture button 464-1 since the pathway of the gesture 466-1 does not intersect the gesture button 464-1. In addition, the gesture 466-1 may not be provided on the gesture button 464-1 since the end location 468-1 is not in the same location as the gesture button 464-1. As described herein, the gesture 466-1 can instruct a computing device or system to perform a first function. For example, the gesture 466-1 can instruct the computing device or system to perform a factory function or function defined by a particular application.

In some examples, the gesture button 464-1 can be moved to a plurality of different locations on the user interface 460-1. For example, the gesture button 464-1 can be moved to a different location 470-1. In some examples the gesture button 464-1 can provide a first custom function that is different than the first function performed in response to the gesture 466-1 when the gesture button 464-1 is positioned at the location illustrated in FIG. 4. In addition, the gesture button 464-1 can provide a second custom function that is different than the first custom function and/or the first function performed in response to the gesture 466-1 when the gesture button 464-1 is moved to the different location 470-1. In some examples, the same gesture 466-1 can be received at the gesture button 464-1 at the different location 470-1 to perform the second custom function and/or a mirrored gesture of the gesture 466-1 can be received at the gesture button positioned at the different location 470-1 to perform the second custom function. For example, the gesture 466-1 can represent a swipe gesture from a right side of the user interface 460-1 to a left side of the user interface 460-1. In this example, a mirrored gesture of the gesture 466-1 can be a swipe gesture from a left side of the user interface 460-1 to a right side of the user interface 460-1.

In some examples, the user interface 460-2 can be the same or similar as user interface 460-2. In some examples, the user interface 460-2 can illustrate when a gesture 466-2 is provided to the gesture button 464-2. For example, the gesture 466-2 can have a start location 465-2 that is within an area of the gesture button 464-2. In some examples, the gesture 466-2 can be provided to the gesture button 464-2 when a path of the gesture 466-2 passes within the area of the gesture button 464-2. As described herein, the gesture 466-2 can instruct a computing device or system to perform a second function that is different than the first function. For example, the gesture 466-2 can instruct the computing device or system to perform a custom function or function selected from a plurality of custom functions.

Figure 5:
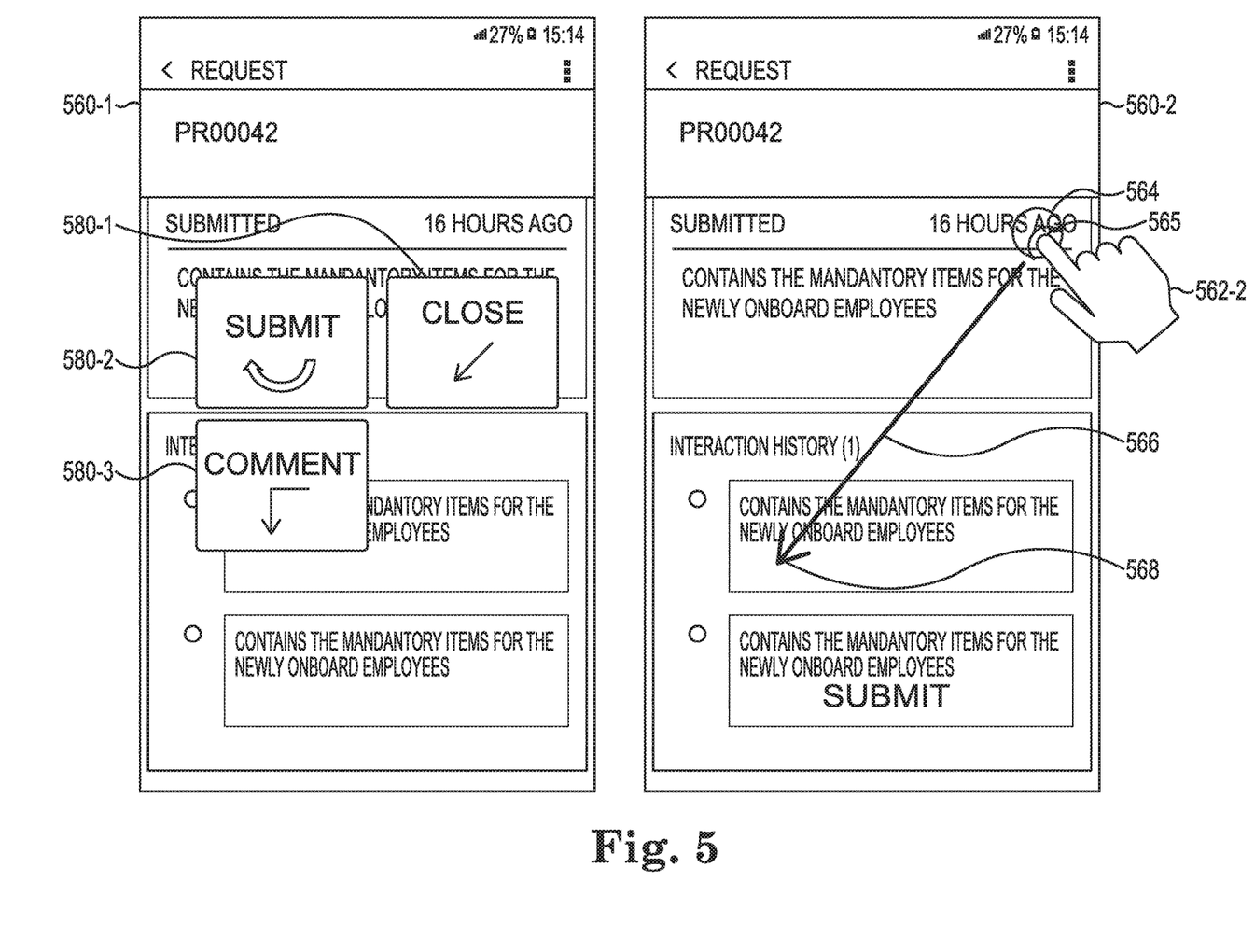
FIG. 5 illustrates an example of a user interface for utilizing gesture buttons consistent with the present disclosure.

FIG. 5 illustrates an example of a user interface 560-1, 560-2 for utilizing gesture buttons 564 consistent with the present disclosure. As described herein, the gesture 566 can include a start location 565 and an end location 568 that can include a pathway between the start location 565 and the end location 568. As described herein, the gesture 566 can be performed by a peripheral device 562.

In some examples, the gesture button 564 can be customized to perform a specific function when a gesture 566 is performed on the gesture button 564. For example, a menu of gesture types 580-1, 580-2, 580-3 can be displayed on the user interface 560-1 that includes a plurality of gesture types and corresponding functions. In some examples, the gesture types 580-1, 580-2, 580-3 can include corresponding functions when the gesture types 580-1, 580-2, 580-3 are performed on the gesture button 564. For example, the gesture types 580-1, 580-2, 580-3 can include corresponding custom functions that are different than a function that is performed when the gesture 566 is not performed on the gesture button 564.

In some examples, the corresponding functions of the gesture types 580-1, 580-2, 580-3 can be altered. For example, the gesture type 580-1 can be changed from a "close" function to a "save" function. In some examples, the corresponding functions of the gesture types 580-1, 580-2, 580-3 can be altered for a particular application. For example, the gesture type 580-2 can be altered from a "submit" function to a "close" function for an internet browser application. In this example, the gesture type 580-2 can remain a "submit" function for a different application than the internet browser application. In this way, a plurality of different corresponding functions can be utilized for each of the gesture types 580-1, 580-2, 580-3.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system, comprising:
    a processing resource; and
    a non-transitory computer readable medium having stored thereon instructions to cause the processing resource to:
    perform a first function on a displayed application in response to a first input including a gesture performed by a user on a user interface without a gesture button being displayed on the user interface;
    display the gesture button on the user interface with the displayed application after performing the first function; and
    perform a second function on the displayed application that is different than the first function in response to a second input including the gesture performed by the user using the gesture button displayed on the user interface,
    wherein the displayed application on the user interface is an internet browser application.

2. The system of claim 1, wherein the gesture button is to be displayed on the user interface at a first location to perform the second function, and wherein the gesture button is to be moved to a second location on the user interface to perform a third function that is different than the second function and the first function in response to a third input including the gesture performed by the user using the gesture button displayed at the second location on the user interface.

3. The system of claim 1, wherein the gesture button is semi-transparent such that a portion of the user interface is to be displayed behind the gesture button.

4. The system of claim 1, wherein the gesture performed using the gesture button begins at a first location of the gesture button.

5. The system of claim 4, wherein the gesture performed using the gesture button ends at a different location than the first location of the gesture button.

6. The system of claim 1, wherein the non-transitory computer readable medium comprises instructions to cause the processing resource to alter a location of the gesture button from a first location on the user interface to a second location on the user interface.

7. A method, comprising:
    determining a first defined function performed on a displayed application that corresponds to a first input including a gesture performed on a user interface without a gesture button being displayed on the user interface;
    determining a second defined function performed on the displayed application that corresponds to a second input including the gesture being performed on the gesture button displayed on the user interface, wherein the second defined function is different than the first defined function;
    performing the first defined function on the displayed application in response to the first input including the gesture;
    displaying the gesture button with the displayed application at a location on the user interface after performing the first defined function, wherein the gesture button is semi-transparent;
    determining that the second input including the gesture is performed on the gesture button displayed on the user interface; and
    performing the second defined function on the displayed application in response to the determination that the second input including the gesture is performed on the gesture button,
    wherein the displayed application on the user interface is an internet browser application.

8. The method of claim 7, comprising determining predefined gestures and corresponding functions for the displayed application on the user interface, wherein the first defined function is a corresponding function for the displayed application and the second defined function is a function selected from a plurality of different functions for the displayed application.

9. The method of claim 7, wherein the gesture performed on the gesture button begins at the location of the gesture button displayed on the user interface.

10. The method of claim 7, comprising determining the location of the gesture button displayed on the user interface, wherein the location of the gesture button corresponds to the second defined function.

11. The method of claim 10, comprising:
    moving the gesture button from the location to a different location; and
    determining a third defined function that corresponds to a third input including the gesture being performed on the gesture button displayed on the user interface at the different location.

12. The method of claim 11, comprising performing the third defined function in response to the determining that the third input including gesture is performed on the gesture button at the different location.

* * * * *